UNITED STATES PATENT OFFICE.

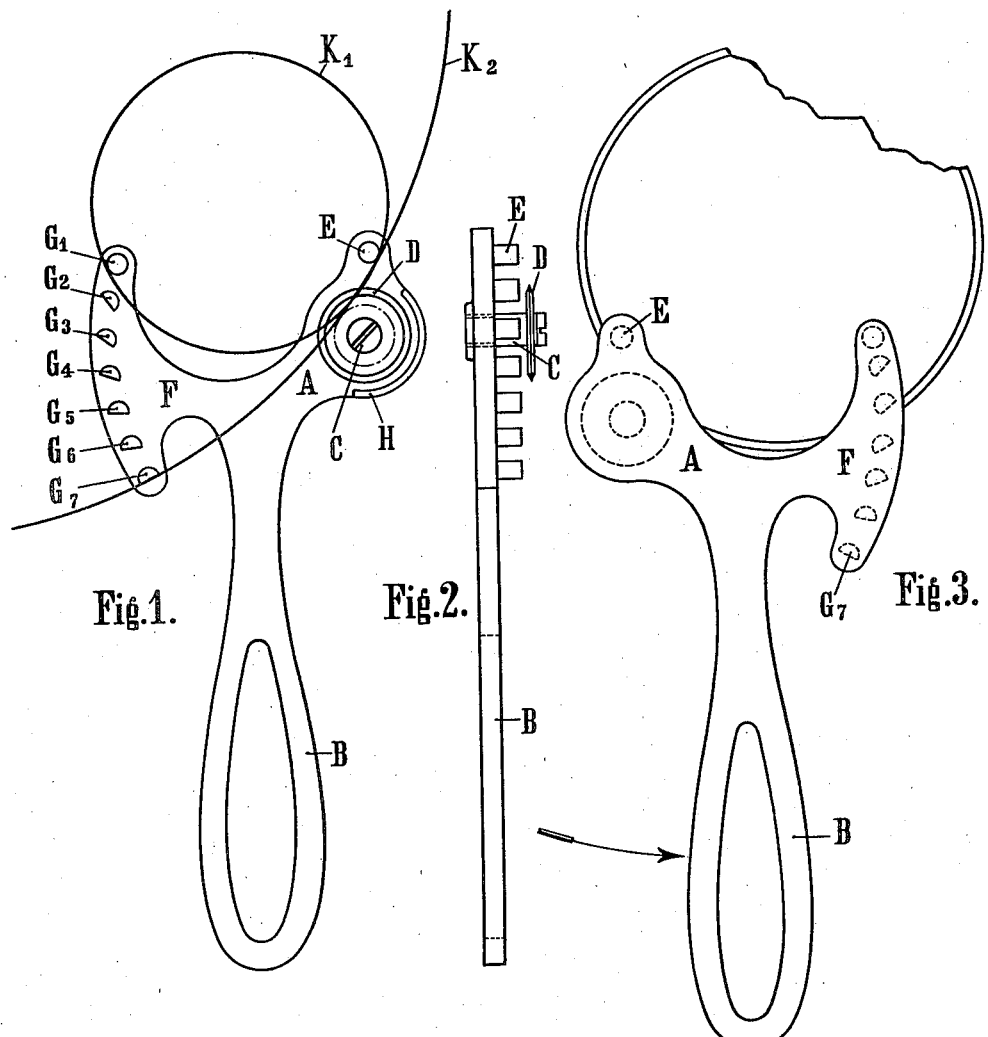

FERDINAND SCHÖNFELD, OF ZURICH, SWITZERLAND.

DEVICE FOR OPENING TINS.

1,102,962.

Specification of Letters Patent. Patented July 7, 1914.

Application filed April 25, 1913. Serial No. 763,529.

*To all whom it may concern:*

Be it known that I, FERDINAND SCHÖN-FELD, mechanician, residing at Badenerstrasse 73, Zurich, Switzerland, have invented certain new and useful Improvements in Devices for Opening Tins, of which the following is a specification.

The present invention relates to a device for opening tins or cans, and it is the object of the invention to provide a device of this character to open cans of different diameters without the necessity of adjusting any part of the device.

In the Figures 1 to 6 the present invention has been exemplified in a constructional form. Fig. 1 is a view of same seen from below, Fig. 2 is a side elevation, Fig. 3 and the plan Fig. 4 show the opener in use for opening a tin, Fig. 5 and Fig. 6 show the guard attachment.

On the arm A of a handle-shaped part B is fitted by means of a screw pin C a freely revoluble circular cutter D. At a short distance from the shaft of this circular cutter a pin E is rigidly secured in the arm A. A second arm F of the same part B is made in form of a rake having a number, say seven, tines $G^1$, $G^2$ to $G^7$. These tines are arranged in a circular curve around the shaft of the cutter in such a manner, that a circle $K^1$, corresponding to the diameter of the smallest tin to be opened would touch the pin E, the cutter and the tine $G^1$, while a circle $K^2$ corresponding to the diameter of the largest tin to be opened, would touch the pin E, the circular cutter and the last tine $G^7$. All circles between this smallest and largest circle would, if drawn tangential to the pin E and the circular cutter cross the arm F at some point between the tines $G^1$ and $G^7$.

The operation in opening a tin is as follows: After the pin E has been engaged on the bead of the tin (Fig. 3), a slight pressure is exerted with the circular cutter against the shell of the tin by moving the handle in the direction of the arrow: the cutter will thereby penetrate the shell close below the lid. According to the size of the tin to be opened the circle corresponding to the inner edge of the bead will cross the rake F close to one of its tines. If now this tine is also engaged on the bead of the tin the circle corresponding to the inner edge which touches this tine and the pin E will not touch the circumference of the circular cutter but be tangential to a smaller circle on the said cutter as the cutter projects to a certain distance into the tin. When now, after the pins have been engaged, the handle is turned to the one side or the other the circular cutter will bear against the not yet cut part of the shell and will cut the same along its whole circumference revolving all the time. Owing to the resistance of the material the pins will be kept tightly pressed against the inner rim of the bead so that the cutter is always well guided and will penetrate to a constant depth into the shell of the tin, so that a smooth and easy cut is obtained. The depth of the cut is determined at a given diameter by the relative positions of the pin, the shaft of the cutter and the respective tine used; with other words different tines may be used for cutting a tin of the same diameter if a different depth of cut is required. In consequence thereof tins of any diameter can be opened, notwithstanding the small number of tines provided, as the depth of the cut can be varied within very wide limits without affecting the quality of the cut.

The guard attachment according to Figs. 5 and 6 consists of a wall H surrounding the circular cutter in a half circle and preventing the cutter from injuring the hand holding the tin, should the pins engaged on the bead slip off. This wall is provided on that side of the cutter which is inoperative, and will therefore not obstruct the opening of the tins.

I claim:

1. An opener for cans having a beaded seam, comprising a cutter to engage the outer side of the can; a pin to engage the inner side of the bead adjacent the cutter; and a plurality of fixed tines one of which is adapted to engage the inner side of the bead, said tines being so arranged relative to the pin and cutter that circles of different diameters passing between said pin and the cutter will come within the innermost and outermost tines to adapt the opener to different sized cans.

2. An opener for cans having a beaded seam, comprising a handle having a pair of laterally projecting arms; a rotary cutter carried by one of the arms to engage the outer side of the can; a pin carried by said arm adjacent the cutter to engage the inner side of the bead; and a plurality of tines carried by the other arm one of which is adapted to engage the inner side of the bead, substantially as and for the purpose specified.

In testimony whereof I affix my signature in presence of two witnesses.

FERDINAND SCHÖNFELD.

Witnesses:
M. M. MAY,
A. PEPPLE.